United States Patent
Toake

(10) Patent No.: US 11,659,105 B2
(45) Date of Patent: May 23, 2023

(54) CONTROL DEVICE RESTRICTING CHANGE IN A WIRELESS CONNECTION DESTINATION AFTER DISCONNECT DURING A PRINTING OPERATION, AND WIRELESS CONNECTION CONTROL METHOD AND STORAGE MEDIUM

(71) Applicant: CASIO COMPUTER CO., LTD., Tokyo (JP)

(72) Inventor: Hitoshi Toake, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 17/441,709

(22) PCT Filed: Mar. 6, 2020

(86) PCT No.: PCT/JP2020/009863
§ 371 (c)(1),
(2) Date: Sep. 22, 2021

(87) PCT Pub. No.: WO2020/195728
PCT Pub. Date: Oct. 1, 2020

(65) Prior Publication Data
US 2022/0201134 A1    Jun. 23, 2022

(30) Foreign Application Priority Data

Mar. 25, 2019  (JP) .............................. JP2019-055817
Feb. 7, 2020   (JP) .............................. JP2020-020125

(51) Int. Cl.
*H04N 1/00*   (2006.01)
*H04W 76/19*  (2018.01)
(Continued)

(52) U.S. Cl.
CPC ........ *H04N 1/00315* (2013.01); *H04W 48/08* (2013.01); *H04W 76/19* (2018.02); *H04W 84/10* (2013.01)

(58) Field of Classification Search
None
See application file for complete search history.

(56) References Cited

U.S. PATENT DOCUMENTS

2005/0208932 A1   9/2005  Tamura et al.
2006/0039336 A1   2/2006  Ishimura
(Continued)

FOREIGN PATENT DOCUMENTS

JP   2005277469 A   10/2005
JP   2006093882 A   4/2006
(Continued)

OTHER PUBLICATIONS

International Search Report (ISR) (and English language translation thereof) dated May 26, 2020 issued in International Application No. PCT/JP2020/009863.
(Continued)

*Primary Examiner* — Andrew H Lam
(74) *Attorney, Agent, or Firm* — Holtz, Holtz & Volek PC

(57) ABSTRACT

A control device includes a wireless communication unit configured to transmit and receive a signal with a communication terminal with which wireless connection has been established, a control unit configured to perform predetermined control according to a request signal from the communication terminal, and a printing unit configured to print on a to-be-printed medium. When the wireless communication unit detects disconnection of the wireless connection with the communication terminal while the printing unit is printing on the to-be-printed medium, the control unit keeps the wireless communication unit in a state in which trans- (Continued)

mission of the beacon signal containing identification information of the wireless communication unit is stopped.

10 Claims, 7 Drawing Sheets

(51) Int. Cl.
*H04W 48/08* (2009.01)
*H04W 84/10* (2009.01)

(56) References Cited

U.S. PATENT DOCUMENTS

| | | | |
|---|---|---|---|
| 2016/0253133 A1* | 9/2016 | Ohhashi | ............... G06F 3/1236 |
| | | | 358/1.15 |
| 2017/0322756 A1 | 11/2017 | Ohhashi | |
| 2017/0339735 A1* | 11/2017 | Kawaguchi | ........... H04W 76/14 |
| 2019/0179579 A1 | 6/2019 | Ohhashi | |
| 2020/0221535 A1 | 7/2020 | Kawaguchi | |
| 2020/0293248 A1 | 9/2020 | Ohhashi | |

FOREIGN PATENT DOCUMENTS

| | | | |
|---|---|---|---|
| JP | 2006289674 A | 10/2006 | |
| JP | 2007036327 A | 2/2007 | |
| JP | 4923283 B2 | 2/2012 | |
| JP | 2012119749 A | 6/2012 | |
| JP | 2016163055 A | 9/2016 | |
| JP | 2017208805 A | 11/2017 | |

OTHER PUBLICATIONS

Written Opinion dated May 26, 2020 issued in International Application No. PCT/JP2020/009863.

* cited by examiner

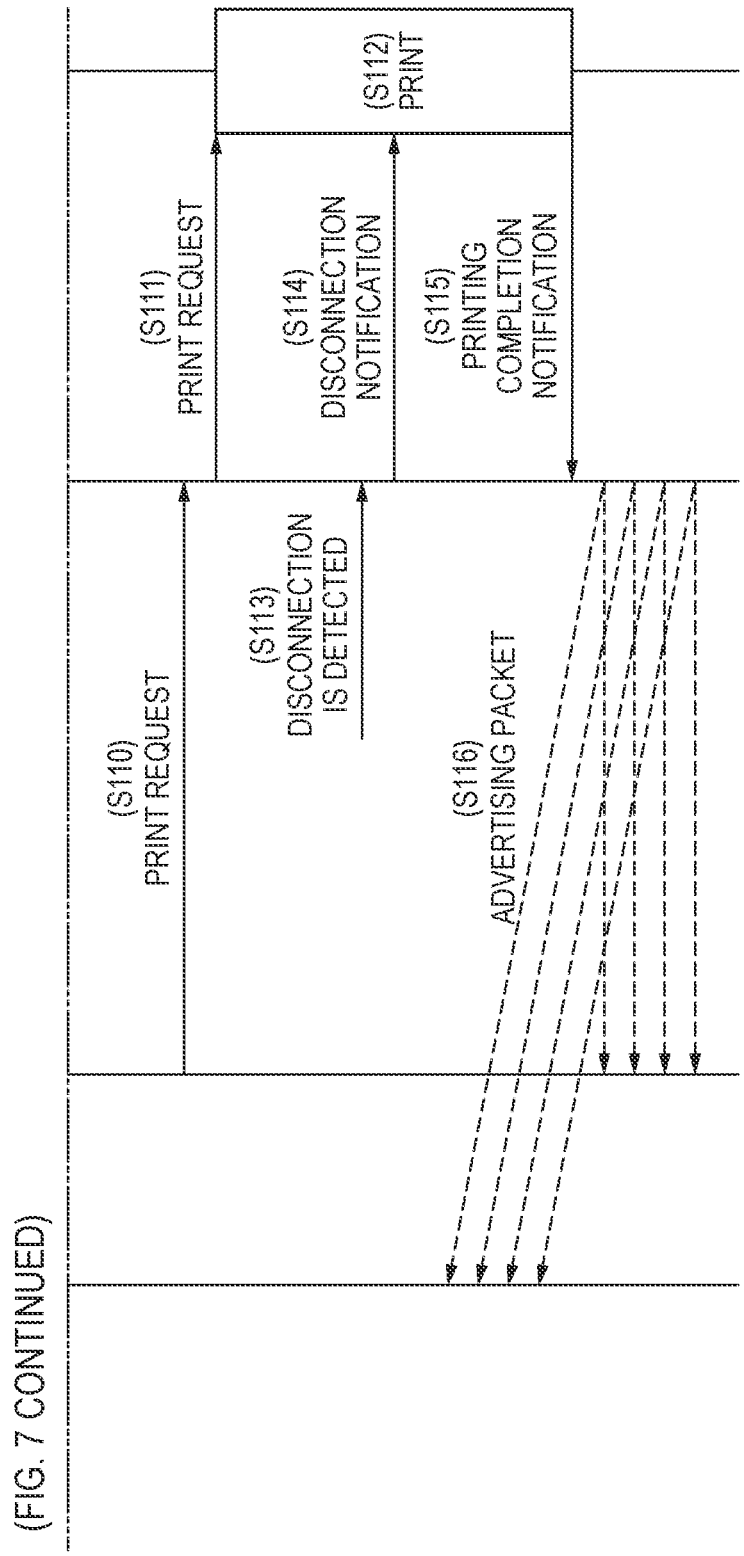

CONTROL DEVICE RESTRICTING CHANGE IN A WIRELESS CONNECTION DESTINATION AFTER DISCONNECT DURING A PRINTING OPERATION, AND WIRELESS CONNECTION CONTROL METHOD AND STORAGE MEDIUM

TECHNICAL FIELD

The present disclosure relates to a control device, wireless connection control methods, and a program.

BACKGROUND ART

In recent years, most of printing devices are configured to support wireless connection such as Bluetooth (registered trademark) Low Energy (hereinafter, referred to as BLE) connection and wireless LAN, in addition to wired connection using cable such as USB connection and wired LAN connection. A printing device configured to support wireless connection is disclosed in Patent Literature 1, for example.

A tape printing device disclosed in Patent Literature 1 is a device configured to print, on a tape, an image corresponding to image data prepared in a personal computer. Patent Literature 1 discloses that connection between the personal computer and the tape printing device may be either wired or wireless connection.

CITATION LIST

Patent Literature

Patent Literature 1: JP2007-036327A

SUMMARY OF INVENTION

Technical Problem

In some cases, printing processing executed in a printing device consume relatively long time. For this reason, while printing processing is executed, a connection destination of a printing device may be switched to a terminal different from one from which the printing processing has been requested. This may occur typically when wireless connection with the terminal from which the printing processing has been requested is unintentionally disconnected due to radio interference or the like and a connection request is issued from another terminal to the printing device. However, such change in a connection destination is not preferable because operation of a terminal connected to the printing device may be unstable. Such technical problem may arise not only in a printing device but also in a device configured to execute processing requested via wireless communication, that is, a control device configured to execute control according to a request.

The present invention has been made in view of the above situations to provide technology of restricting change in a wireless connection destination of a control device during execution of control according to a request.

Solution to Problem

A control device according to an aspect of the present invention includes: a wireless communication unit configured to transmit and receive a signal with a communication terminal with which wireless connection has been established; and a control unit configured to perform predetermined control according to a request signal from the communication terminal, in which the control unit keep the wireless communication unit in a state in which transmission of a beacon signal containing identification information of the wireless communication unit is stopped while executing the predetermined control according to the request signal.

A wireless connection control method according to an aspect of the present invention includes: a control device receiving a request signal from a communication terminal with which wireless connection has been established; the control device performing predetermined control according to the request signal; and the control device keeping a state in which transmission of a beacon signal containing identification information is stopped during execution of the predetermined control according to the request signal.

A program according to an aspect of the present invention causes a control device to execute processing of: causing a wireless communication unit to receive a request signal from a communication terminal with which wireless connection has been established; performing predetermined control according to the request signal; and keeping the wireless communication unit in a state in which transmission of a beacon signal containing identification information of the wireless communication unit is stopped during execution of the predetermined control according to the request signal.

Advantageous Effects of Invention

According to the above aspects, it is possible to restrict change in a wireless connection destination of a control device during execution of control according to a request.

DESCRIPTION OF EMBODIMENTS

Figure 1:
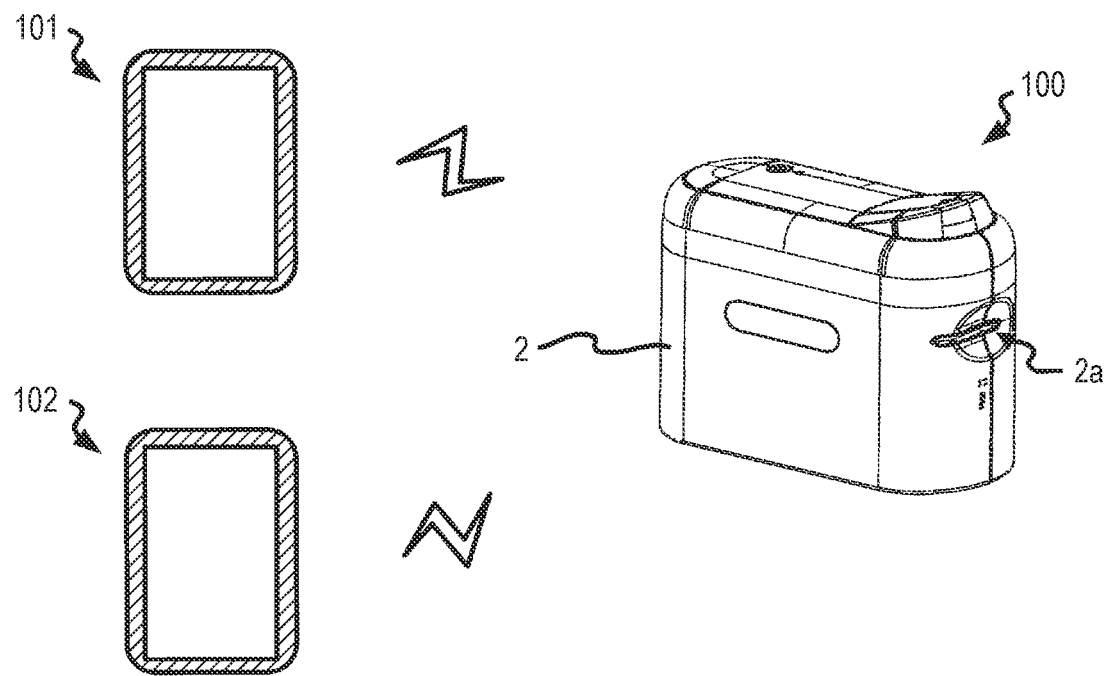
FIG. 1 shows a configuration of a printing system.

FIG. 1 shows an example of a configuration of a printing system according to the present embodiment. The printing system shown in FIG. 1 includes: a printing device 100; and a plurality of information processing devices (an information processing device 101 and an information processing device 102) configured to connect to the printing device 100.

The printing device 100 is a device configured to perform printing on a to-be-printed medium and is an example of the control device configured to perform control according to a request received via wireless communication. Although an example in which the printing device 100 is a thermal-transfer label printer will be described, the printing method of the printing device 100 is not limited to the thermal-transfer printing but may be thermal printing, for example. The printing device 100 is not limited to a label printer but may be an inkjet printer or a laser printer, for example.

The information processing device 101 and the information processing device 102 are each a device configured to connect to the printing device 100 to transmit print data. Note that the information processing device 101 and the information processing device 102 will be simply referred to as an information processing device when not particularly identified. The information processing device is, for example, a portable computer such as a smart phone and a tablet computer, but is not limited to a portable computer. Any device such as a desktop computer and a television can be the information processing device as long as it is configured to wirelessly connect to the printing device 100 to transmit print data.

The printing device 100 and the information processing device are configured to transmit and receive data via wireless communication. The standard of wireless communication performed between the printing device 100 and the information processing device is, for example, Bluetooth (registered trademark) Low Energy (hereinafter, referred to as BLE). Although an example in which the printing device 100 and the information processing device communicate with each other according to the BLE standard will be described, the printing device 100 and the information processing device may communicate with each other according to another wireless communication standard.

As shown in FIG. 1, a device housing 2 of the printing device 100 is substantially a cylindroid body with an oval-shaped base. Among surfaces of the device housing 2, parts corresponding to side surfaces of the cylindroid body consist of two planes orthogonal to the base and two curves each having a substantially semicircular section. One of the two curves is formed with a concave portion.

The concave portion is formed with a discharge port 2a. A to-be-printed medium M on which printing has been performed in the printing device 100 is discharged out of the discharge port 2a into an outside of the device. The discharge port 2a is an opening parallel to the base.

Figure 2:
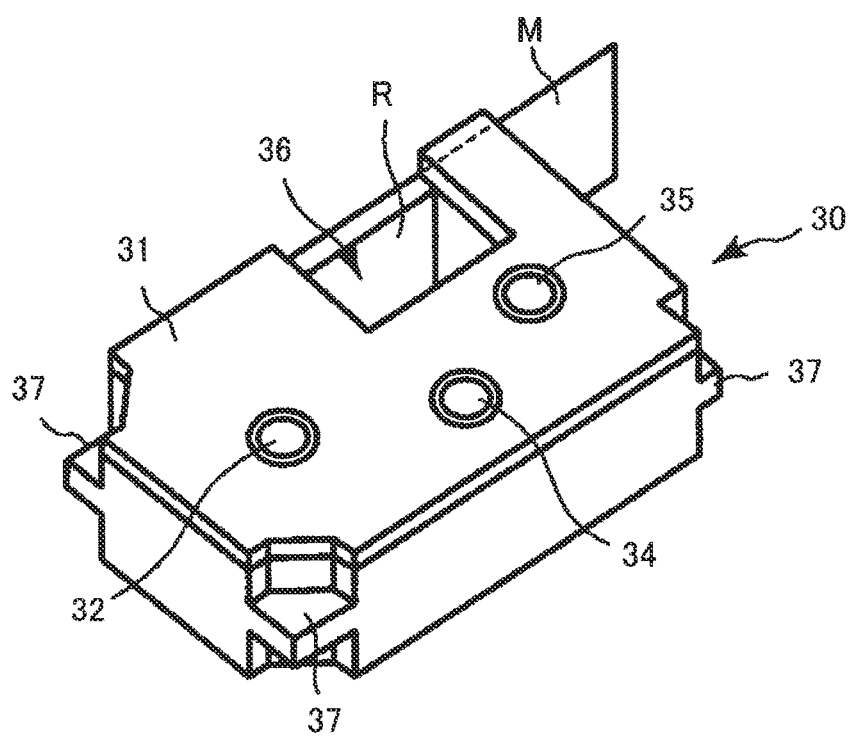
FIG. 2 is a perspective view of a tape cartridge 30 accommodated in a printing device 100.
Figure 3:
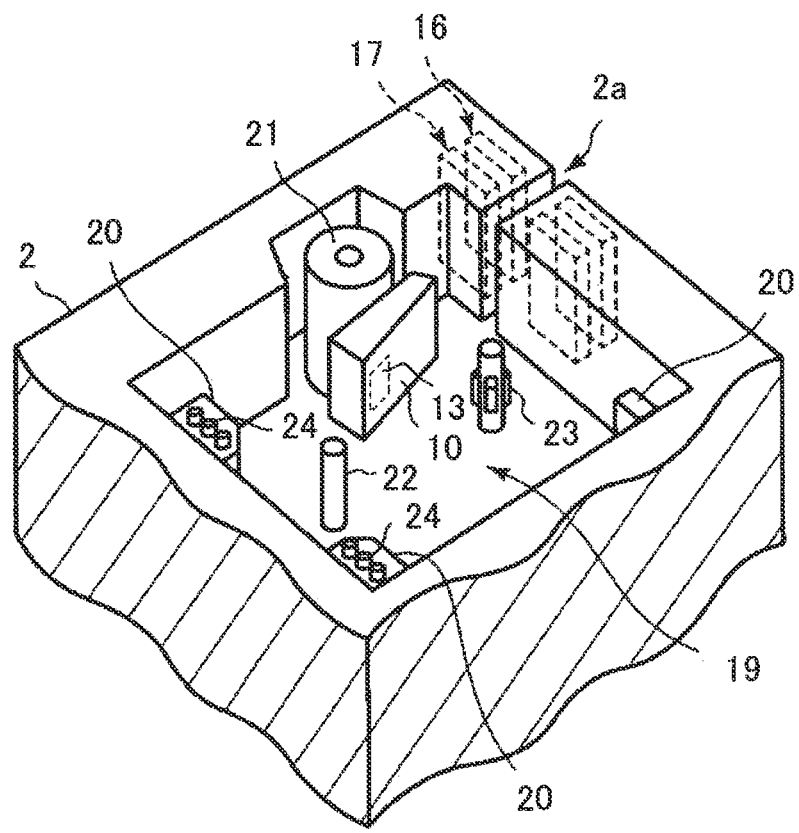
FIG. 3 is a perspective view of a cartridge accommodation portion 19 of the printing device 100.
Figure 4:
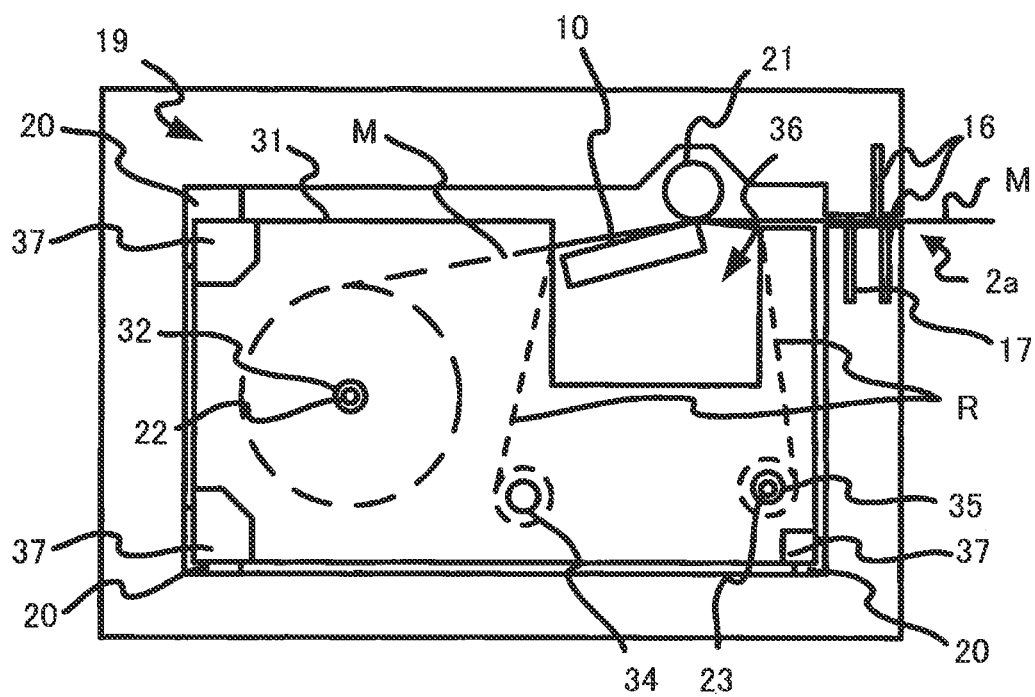
FIG. 4 is a sectional view of the printing device 100.

FIG. 2 is a perspective view of a tape cartridge 30 accommodated in the printing device 100. FIG. 3 is a perspective view of a cartridge accommodation portion 19 of the printing device 100. FIG. 4 is a sectional view of the printing device 100. The tape cartridge 30 shown in FIG. 2 is detachably accommodated in the cartridge accommodation portion 19 shown in FIG. 3. FIG. 4 shows a state in which the tape cartridge 30 is accommodated in the cartridge accommodation portion 19.

As shown in FIG. 2, the tape cartridge 30 has a cartridge case 31 configured to accommodate the to-be-printed medium M and an ink ribbon R and provided with a thermal-head to-be-inserted portion 36 and engaging portion 37. The cartridge case 31 is provided with a tape core 32, an ink-ribbon supply core 34, and an ink-ribbon winding core 35.

The to-be-printed medium M is wound in a roll shape on the tape core 32 inside the cartridge case 31. The to-be-printed medium M is, for example, a tape having: a base material with an adhesive layer; and an exfoliative paper pasted detachably on the base material so as to cover the adhesive layer. However, the to-be-printed medium M may be a tape without an exfoliative paper. The ink ribbon R for thermal-transfer printing is wound in a roll shape on the ink-ribbon supply core 34 inside the cartridge case 31 with its end wound on the ink-ribbon winding core 35.

As shown in FIG. 3, the cartridge accommodation portion 19 of the device housing 2 is provided with a plurality of cartridge receiving members 20 for supporting the tape cartridge 30 in a predetermined position. The cartridge receiving member 20 are provided with tape-width detection switches 24 for detecting the width of a tape (to-be-printed medium M) accommodated in the tape cartridge 30.

The tape-width detection switch 24 is a switch for detecting the width of the to-be-printed medium M based on the shape of the tape cartridge. The plurality of tape-width detection switches 24 is provided in the cartridge accommodation portion 19. The tape cartridges having different tape widths are configured to press down each of the plurality of tape-width detection switches 24 in different combinations. Thereby, a control circuit 25 (refer to FIG. 5), which will be described later, determines the type of the tape cartridge based on the combination of the tape-width detection switches 24 pressed, so that the width (tape width) of the to-be-printed medium M is determined.

The cartridge accommodation portion 19 is further provided with: a thermal head 10 having a plurality of heat-generating elements and configured to print on the to-be-printed medium M; a platen roller 21 configured to convey the to-be-printed medium M; a tape-core engaging shaft 22; and an ink-ribbon winding driving shaft 23. In addition, a thermistor 13 is embedded in the thermal head 10. The thermistor 13 is configured to measure a temperature of the thermal head 10.

As shown in FIG. 4, in a state in which the tape cartridge 30 is accommodated in the cartridge accommodation portion 19, the engaging portions 37 provided in the cartridge case 31 are supported by the cartridge receiving members 20 provided in the cartridge accommodation portion 19, the thermal head 10 is inserted into the thermal-head to-be-inserted portion 36 formed in the cartridge case 31, the tape core 32 of the tape cartridge 30 is engaged with the tape-core engaging shaft 22, and the ink ribbon winding core 35 is engaged with the ink-ribbon winding driving shaft 23.

When a print instruction is input from the information processing device to the printing device 100, the to-be-printed medium M is reeled out from the tape core 32 by rotation of the platen roller 21. At this time, the ink-ribbon winding driving shaft 23 rotates in sync with the platen roller 21, so that the ink ribbon R is reeled out from the ink-ribbon supply core 34 together with the to-be-printed medium M. Thereby, the to-be-printed medium M and the ink ribbon R are conveyed in a superimposed manner. When passing through between the thermal head 10 and the platen roller 21, the ink ribbon R is heated by the thermal head 10 and ink is transferred onto the to-be-printed medium M, so that printing is performed.

The ink ribbon R used, which has passed through between the thermal head 10 and the platen roller 21, is wound on the ink-ribbon winding core 35. On the other hand, the to-be-printed medium M printed, which has passed through between the thermal head 10 and the platen roller 21, is cut by a half-cut mechanism 16 and a full-cut mechanism 17 and is discharged out of the discharge port 2a.

Figure 5:
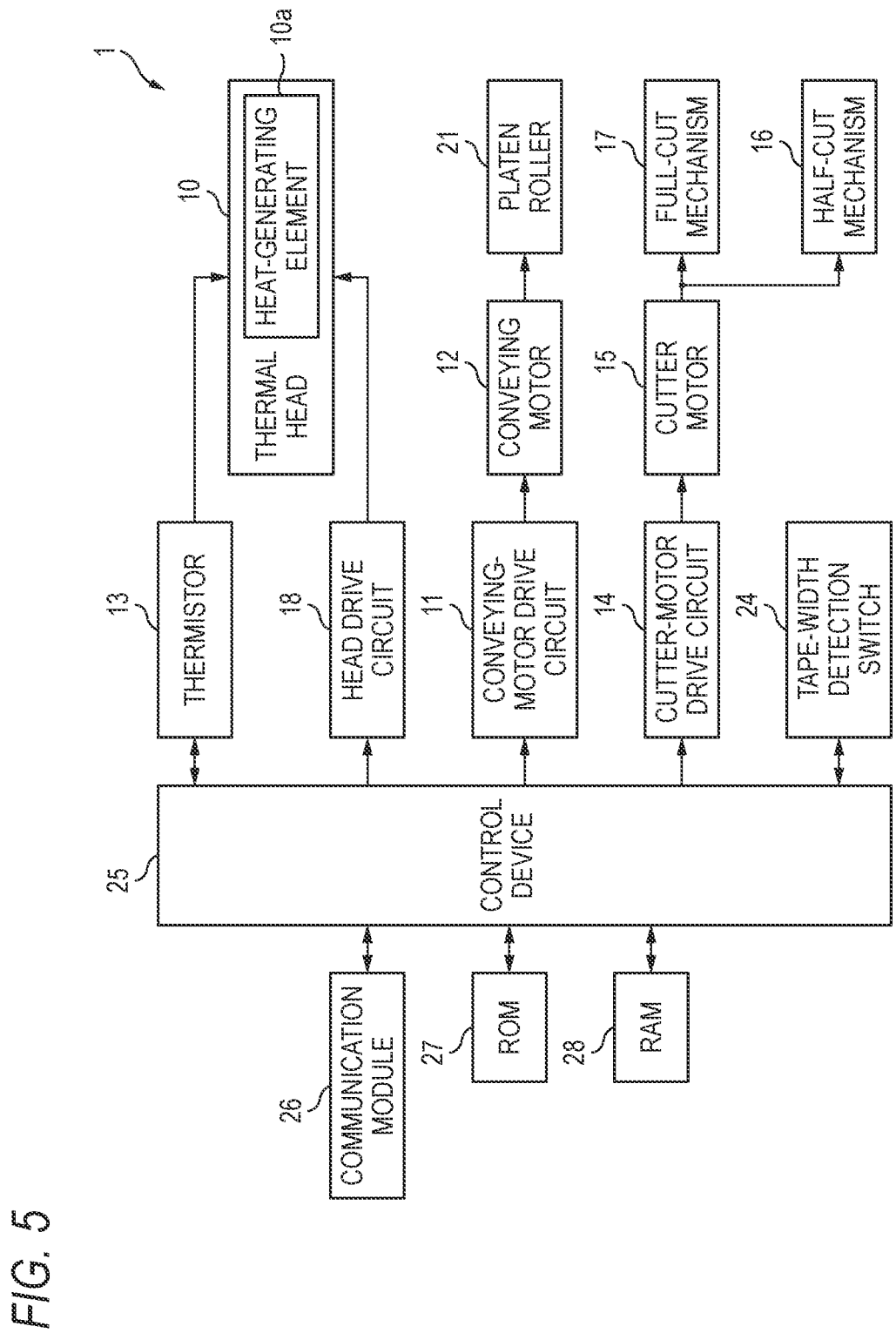
FIG. 5 is a block diagram showing a hardware configuration of the printing device 100.

FIG. 5 is a block diagram showing a hardware configuration of the printing device 100. As shown in FIG. 5, the printing device 100 includes: a control circuit 25; a communication module 26; a read-only memory (ROM) 27; a random-access memory (RAM) 28; a head drive circuit 18; a conveying-motor drive circuit 11; a conveying motor 12; a cutter-motor drive circuit 14; a cutter motor 15; a half-cut mechanism 16; and a full-cut mechanism 17, in addition to the above configurations.

The control circuit 25 is a control unit of the printing device 100 and includes, for example, some processing circuit such as a central processing unit (CPU). The control circuit 25 is configured to load a program stored in the ROM 27 into the RAM 28 and execute it, thereby controlling operation of each unit (the communication module 26, the thermal head 10, and the like) of the printing device 100. Note that the control circuit 25, the ROM 27, and the RAM 27 constitute, for example, a microcomputer of the printing device 100.

The communication module 26 is a wireless communication unit configured to transmit and receive a signal with a communication terminal with which wireless connection has been established. The communication module 26 is configured to establish wireless connection with the information processing device, which is a communication terminal, thereby receiving a print request from the information processing device. The print request is an example of request signals for requesting the printing device 100 to execute specific control processing. For example, the control circuit 25 is configured to perform predetermined control according to a request signal from the information processing device. Note that, in this example, the communication module 26 is a BLE module and includes an antenna, a radio frequency (RF) unit, and a base band unit.

In the ROM 27, a print program for printing on the to-be-printed medium M and a variety of data (for example, fonts and the like) necessary for execution of the print program are stored. The RAM 28 is a working memory used for execution of a program. Note that a computer-readable recording medium in which a program and data used for processing in the printing device 100 are stored includes a physical (non-transitory) recording medium such as the ROM 27.

The head drive circuit 18 is configured to energize heat-generating elements 10a of the thermal head 10 according to print data and a control signal. The thermal head 10 is a printing unit configured to print on the to-be-printed medium M according to a print request from the information processing device and includes the plurality of heat-generating elements 10a aligned in the main scanning direction. The thermal head 10 is configured to heat the ink ribbon by the heat-generating elements 10a to print line-by-line on the to-be-printed medium M by thermal-transfer printing. More specifically, the thermal head 10 is configured to print on a to-be-printed medium according to a request signal from the information processing device.

The conveying-motor drive circuit 11 is configured to drive the conveying motor 12. The conveying motor 12 is, for example, a stepper motor, a DC motor, or the like and is configured to rotate the platen roller 21. The platen roller 21 is rotated by torque of the conveying motor 12 and is configured to convey the to-be-printed medium M in the length direction (the sub scanning direction, or the conveying direction) of the to-be-printed medium M.

The cutter-motor drive circuit 14 is configured to drive the cutter motor 15. The full-cut mechanism 17 and the half-cut mechanism 16 are actuated by torque of the cutter motor 15 and are configured to full or half cut the to-be-printed medium M. A full cut is an operation of cutting the base material of the to-be-printed medium M along the width direction of the to-be-printed medium M together with the exfoliative paper. A half cut is an operation of cutting only the base material along the width direction.

Figure 6:
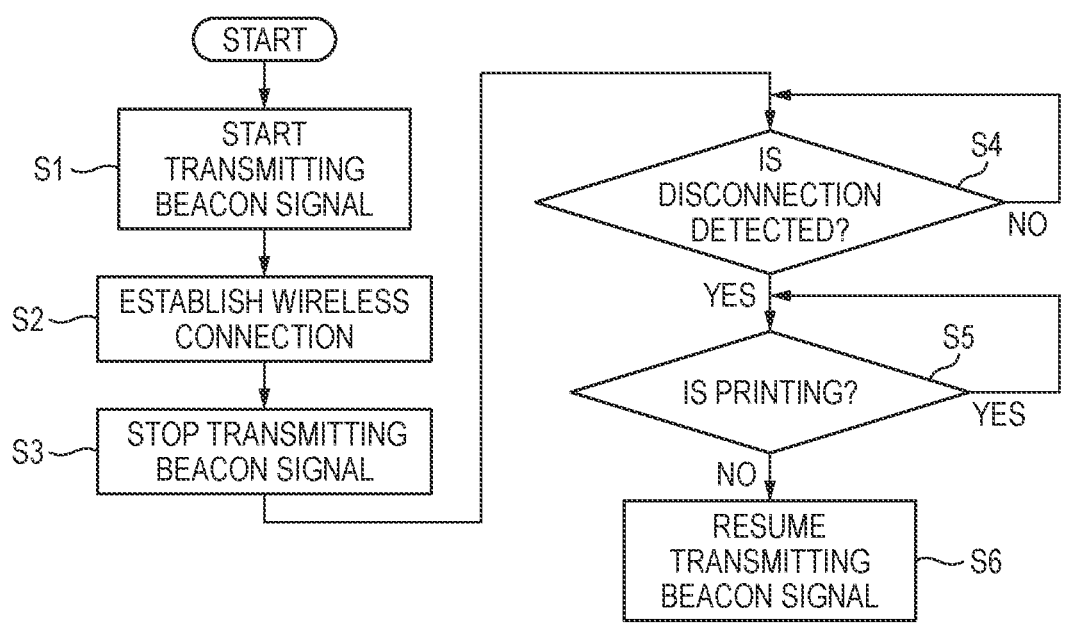
FIG. 6 is a flowchart showing an example of processing executed by the printing device 100.

FIG. 6 is a flowchart showing an example of processing executed by the printing device 100. A wireless connection control method of the printing device 100 will be described with reference to FIG. 6.

When the control circuit 25 executes the program to start the processing shown in FIG. 6, the printing device 100 starts transmitting a beacon signal (step S1). Here, the communication module 26 starts transmitting the beacon signal. More specifically, the control circuit 25 causes the communication module 26 to start transmitting the beacon signal. The beacon signal is a signal containing identification information and is a signal for informing surrounding communication devices of its presence. In a case in which the communication module 26 of the printing device 100 is a BLE module, the beacon signal is an advertising packet according to the BLE standard. The identification information is identification information of the printing device 100 and more specifically, identification information of the communication module 26.

Thereafter, when a connection request is received from the information processing device that has received the beacon signal, the printing device 100 establishes wireless connection with the information processing device that has transmitted the connection request (step S2). Here, the communication module 26 establishes wireless connection with the information processing device transmitting the connection request according to procedures of communication standard.

When the wireless connection is established, the printing device 100 stops transmitting the beacon signal (step S3). Here, the communication module 26 stops transmitting the beacon signal. More specifically, the control circuit 25 causes the communication module 26 to stop transmitting the beacon signal. Thereafter, the printing device 100 and the information processing device exchange data such as a print request.

The printing device 100 monitors disconnection of the wireless connection (step S4). When disconnection is detected (YES in step S4), the printing device 100 determines whether the printing unit of the printing device 100 is printing (step S5). Here, when disconnection of the wireless connection is detected in step S4, the printing device 100 determines whether the printing unit is printing based on whether a print request has been notified to the microcomputer of the printing device 100, and if so, based on whether a notification of printing completion has been received from the microcomputer after notifying the print request.

When it is determined that the printing unit is printing (YES in step S5), the printing device 100 repeats the determination until printing is completed. When it is determined that the printing unit is not printing (NO in step S5), the printing device 100 causes the communication module 26 to resume transmitting the beacon signal (step S6) and ends the processing shown in FIG. 6.

As described above, in the printing device 100, when the communication module 26 detects disconnection of wireless connection with the information processing device before predetermined control to a request signal is completed, the microcomputer (control circuit 25) causes the communication module 26 to stop transmitting the beacon signal containing identification information of the communication module 26 at least until the predetermined control is completed after disconnection of the wireless connection is detected. Specifically, when the communication module 26 detects disconnection of the wireless connection with the information processing device before printing in the printing unit is completed, the control circuit 25 causes the communication module 26 to stop transmitting the beacon signal containing the identification information of the communication module 26 at least until printing in the printing unit is completed after the disconnection of the wireless connection is detected. In addition, after printing in the printing unit is completed, the control circuit 25 may cause the communication module 26 to start transmitting the beacon signal, thereby resuming transmitting the beacon signal. In this case, even when connection is disconnected during printing, the printing device 100 remains invisible from the information processing device during the printing. For this reason, it is possible to restrict change in a wireless connection destination of the printing device 100 during printing. Therefore, it is possible to prevent an acknowledgment (ACK) from being transmitted to an information processing device different from the information processing device that has transmitted a print request, which is caused by change in a connection destination during printing. As a result, it is possible to stably operate the information processing device connected to the printing device 100.

Figure 7:
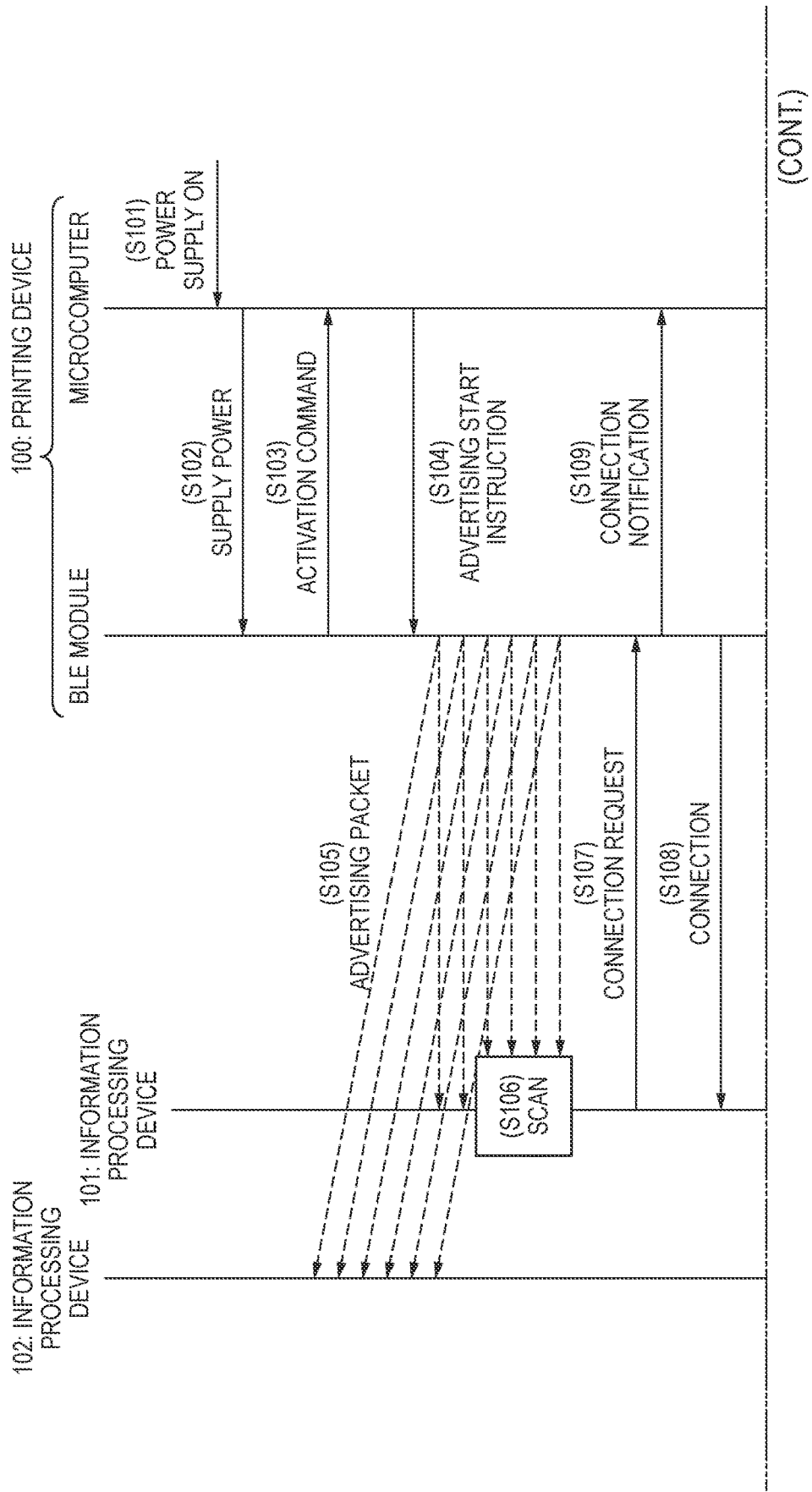
FIG. 7 is a sequence diagram showing an example of processing of the printing system.

FIG. 7 is a sequence diagram showing an example of processing of the printing system. The wireless connection control method will be described in more detail with reference to an example in which the communication module 26 is a BLE module.

When the printing device 100 is turned on (step S101), the microcomputer of the printing device 100 supplies power to the BLE module (step S102). The BLE module receiving the power transmits an activation command to the microcomputer (step S103) and receives an advertising start instruction from the microcomputer, which has received the activation command (step S104).

The BLE module, which has received the advertising start instruction from the microcomputer, transmits an advertising packet according to the BLE standard as the beacon signal (step S105). Since broadcasted to a plurality of advertising channels at a predetermined time interval, the advertising packet is transmitted to both the information processing device 101 and the information processing device 102.

The information processing device 101 scans for a connection destination (step S106). Scan may be passive or active scan. Thereby, the information processing device 101 finds out the printing device 100.

Thereafter, the information processing device 101 transmits a connection request to the printing device 100 (step S107). When wireless connection is established through procedures according to the BLE standard (step S108), the communication module 26 notifies the microcomputer of establishment of the wireless connection (step S109). The notification of the establishment of the wireless connection from the communication module 26 to the microcomputer may be by switching a signal level of a specific terminal between an H level and an L level.

When the information processing device 101 connected to the printing device 100 transmits a print request to the printing device 100 (step S110), the communication module 26, which has received the print request from the information processing device 101, notifies the microcomputer of the print request (step S111).

When receiving the print request, the microcomputer starts printing processing for causing the printing unit to print (step S112). That is, the microcomputer is a control unit configured to cause the printing unit to print according to a print request received through the communication module 26.

Thereafter, when the wireless connection between the printing device 100 and the information processing device 101 is disconnected, the communication module 26 detects the disconnection of the wireless connection (step S113) and notifies the microcomputer of the disconnection of wireless connection (step S114). Note that the reason of disconnection of the wireless connection is not particularly limited. The disconnection may be unintentional or based on a disconnection request from the information processing device 101. The notification of disconnection of wireless connection from the communication module 26 to the microcomputer is, for example, by switching a signal level of a specific terminal between an H level and an L level. In this case, one of the H level and the L level represents a connection state, and the other a disconnection state.

After notifying the microcomputer of the print request, since the communication module 26 has not received a notification of printing completion from the microcomputer yet, the communication module 26 does not start transmitting an advertising packet immediately after notifying the disconnection of the microcomputer. After printing by the printing unit is completed, the microcomputer notifies the communication module 26 of completion of the printing (step S115). The communication module 26 resumes transmitting an advertising packet according to the BLE standard, in response to the notification from the microcomputer, that is, after receiving the notification from the microcomputer (step S116). In other words, the microcomputer causes the communication module 26 to resume transmitting the beacon signal in response to the printing completion notification from the microcomputer. Note that the reason of withholding transmission of the beacon signal until the printing completion notification is received is for preventing establishment of wireless connection with a device different from a device that has transmitted a print request during printing processing. If wireless connection with a device different from a device that has transmitted a print request is established during printing processing, a response to the print request may be returned to a device different from the device that has transmitted the print request.

As described above, in the printing device 100, the BLE module determines whether the printing unit is printing based on a communication history with the microcomputer. Therefore, by improving the BLE module, it is possible to implement the above operations without making any change to the microcomputer.

Figure 8:
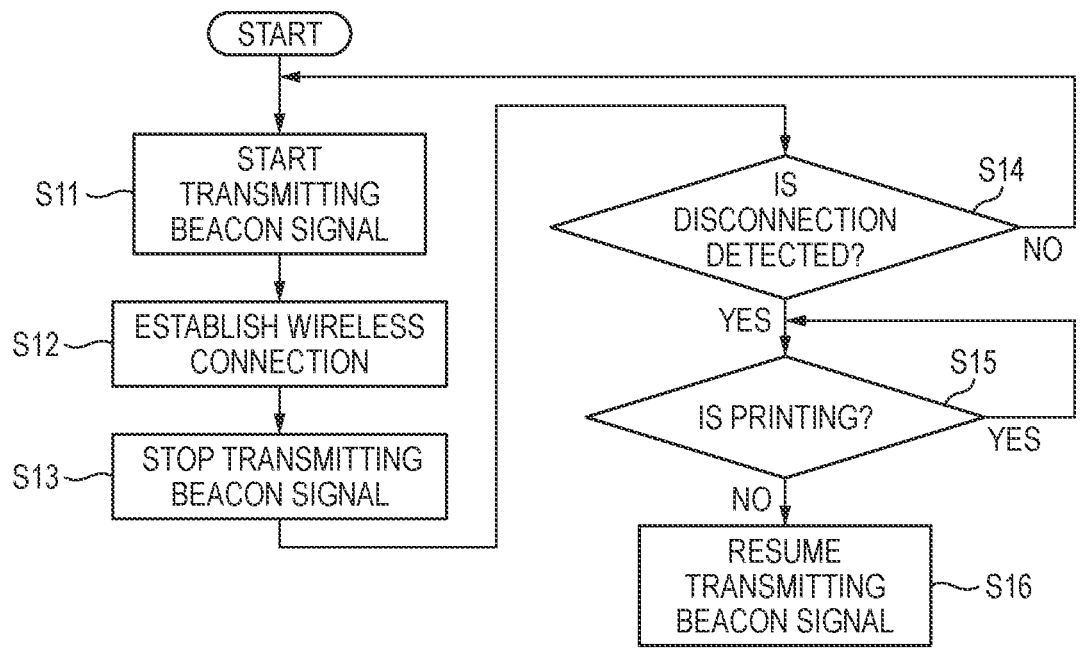
FIG. 8 is a flowchart showing another example of processing executed by the printing device 100.

FIG. 8 is a flowchart showing another example of processing executed by the printing device 100. A modified embodiment of the wireless connection control method of the printing device 100 will be described with reference to FIG. 8.

When the control circuit 25 executes the program and starts the processing shown in FIG. 8, the printing device 100 starts transmitting a beacon signal (step S11). Thereafter, when a connection request is received from the information processing device that has received the beacon signal, the printing device 100 establishes wireless connection with the information processing device that has transmitted the connection request (step S12). When the wireless connection is established, the printing device 100 stops transmitting the beacon signal (step S13). The processing from step S11 to step S13 is similar to the processing from step S1 to step S3 shown in FIG. 6.

When the wireless connection is established, the printing device 100 monitors disconnection of the wireless connection (step S14). When disconnection is detected, the printing device 100 re-executes the processing from step S11 to step S13. Thereby, the connection is maintained with the printing device 100. The way of determining whether the printing unit is printing is similar to step S5 shown in FIG. 6.

When it is determined that the printing unit is printing (YES in step S15), the printing device 100 repeats the determination until printing is completed. When it is determined that the printing unit is not printing (NO in step S15), the printing device 100 causes the communication module

26 to resume transmitting the beacon signal (step S16) and ends the processing shown in FIG. 8.

As described above, in the printing device 100, after predetermined control (here, the printing processing) according to a request signal once starts, the microcomputer (control circuit 25) causes the communication module 26 to stop transmitting a beacon signal containing identification information of the communication module 26 until the predetermined control is completed regardless of whether wireless connection is disconnected. That is, similar to the processing shown in FIG. 6, since the microcomputer does not cause the communication module 26 to transmit a beacon signal containing identification information during printing, the printing device 100 remains invisible from the information processing device. Thereby, it is possible to restrict change in a wireless connection destination of the printing device 100 during printing, so that it is possible to achieve effects similar to the processing shown in FIG. 6.

The above embodiments are specific examples for easy understanding of the present invention, and the present invention is not limited to the embodiments. The information processing device, the wireless connection control methods, and the program can be diversely modified or changed as long as in the gist of the claims.

In the above, an example in which the printing device 100 remains invisible from the information processing device during printing has been described. However, in addition to being invisible, response to the connection request may be restricted. For example, when the communication module 26 receives a connection request from the outside in a state in which disconnection of wireless connection with the information processing device is detected after a print request, the control circuit 25 may restrict the communication module 26 from responding to the connection request from the outside. Thereby, it is possible to restrict change in a wireless connection destination of the printing device 100 during printing more securely.

Also, when the communication module 26 receives a connection request from the outside in a state in which disconnection of wireless connection with the information processing device is detected after a print request, if the connection request is from the information processing device with which wireless connection has been established before the disconnection, the control circuit 25 may cause the communication module 26 to respond to the connection request. In this case, it is also possible to restrict change in a wireless connection destination of the printing device 100 during printing more securely.

Although the printing device 100 has been took for example, any device configured to perform control according to a request signal received via the wireless communication can be the control device, and the control device is not limited to a printing device. For example, the control device may be an imaging device such as a digital still camera and a digital video camera configured to control an imaging unit according to an imaging request received via wireless communication. In this case, for example, when wireless connection is disconnected after a smart phone transmits an imaging request (request signal) to the imaging device, the imaging device stops transmitting a beacon signal at least until imaging control is completed after the disconnection of the wireless connection is detected. Thereby, it is possible to prevent information from being confused between the imaging device and the communication terminal.

In the above embodiment, an example in which transmission of a beacon signal is stopped until predetermined control is completed after wireless connection is established has been described. However, the stop time of the beacon signal is not limited thereto. The beacon signal may be stopped at least until predetermined control is completed after disconnection of wireless connection is detected.

The inventions described in the claims at the time of filing the present application are appended below.

[Appendix 1]

A control device including:

a wireless communication unit configured to transmit and receive a signal with a communication terminal with which wireless connection has been established; and a control unit configured to perform predetermined control according to a request signal from the communication terminal, in which the control unit keeps the wireless communication unit in a state in which transmission of a beacon signal containing identification information of the wireless communication unit is stopped while executing the predetermined control according to the request signal.

[Appendix 2]

The control device according to Appendix 2, in which, when the wireless communication unit detects disconnection of the wireless connection with the communication terminal while the control unit is executing the predetermined control according to the request signal, the control unit keeps the wireless communication unit in a state in which transmission of a beacon signal containing identification information of the wireless communication unit is stopped while executing the predetermined control according to the request signal.

[Appendix 3]

The control device according to Appendix 2, further comprising:

a printing unit configured to print on a to-be-printed medium according to a request signal from the communication terminal, in which, when the wireless communication unit detects disconnection of the wireless connection with the communication terminal while the printing unit is printing on the to-be-printed medium according to the request signal, the control unit keeps the wireless communication unit in a state in which transmission of a beacon signal containing identification information of the wireless communication unit is stopped while executing the printing according to the request signal.

[Appendix 4]

The control device according to one of Appendices 1 to 3, in which, when a connection request is received from the outside in a state in which the wireless communication unit detects disconnection of the wireless connection with the communication terminal, the control unit restrict the wireless communication unit from responding to the connection request from the outside.

[Appendix 5]

The control device according to any one of Appendices 1 to 3, in which, when a connection request is received from the outside in a state in which the wireless communication unit detects disconnection of the wireless connection with the communication terminal, if the connection request is from a communication terminal with which the wireless connection has been established, the control unit causes the wireless communication unit to respond to the connection request.

[Appendix 6]

The control device according to any one of Appendices 1 to 5, in which the control unit is configured:

to perform the predetermined control according to the request signal received via the wireless communication unit, to notify the wireless communication unit of completion of the predetermined control after the predetermined control is completed, and to cause the wireless communication unit to start transmitting the beacon signal, in response to the notification from the control unit.

[Appendix 7]

The control device according to Appendix 3, in which the control unit is configured:

to cause the printing unit to print according to the request signal received via the wireless communication unit, to notify the wireless communication unit of completion of printing after printing by the printing unit is completed, and to cause the wireless communication unit to start transmitting the beacon signal, in response to the notification from the control unit.

[Appendix 8]

The control device according to any one of Appendices 1 to 5, wherein the control unit is configured to cause the wireless communication unit to start transmitting the beacon signal after the predetermined control is completed.

[Appendix 9]

The control device according to any one of Appendices 1 to 8, in which the wireless communication unit is a Bluetooth Low Energy (BLE) module, and the beacon signal is an advertising packet according to the BLE standard.

[Appendix 10]

A wireless connection control method including:

a control device receiving a request signal from a communication terminal with which wireless connection has been established;

the control device performing predetermined control according to the request signal; and the control device keeping a state in which transmission of a beacon signal containing identification information is stopped during execution of the predetermined control according to the request signal.

[Appendix 11]

A program for causing a control device to execute processing of:

causing a wireless communication unit to receive a request signal from a communication terminal with which wireless connection has been established;

performing predetermined control according to the request signal; and keeping the wireless communication unit in a state in which transmission of a beacon signal containing identification information of the wireless communication unit is stopped during execution of the predetermined control according to the request signal.

Although the present invention has been described in detail with reference to the specific embodiments, it is obvious to one skilled in the art that a variety of changes or modifications can be made without departing from the gist and the scope of the present invention.

The present application is based on Japanese Patent Application No. 2019-055817, filed on Mar. 25, 2019 and No. 2020-020125, filed on Feb. 7, 2020, and the contents thereof are incorporated herein by reference.

REFERENCE SIGNS LIST

2: device housing
2a: discharge port
10: thermal head
10a: heat-generating element
11: conveying-motor drive circuit
12: conveying motor
13: thermistor
14: cutter-motor drive circuit
15: cutter motor
16: half-cut mechanism
17: full-cut mechanism
18: head drive circuit
19: cartridge accommodation portion
20: cartridge receiving member
21: platen roller
22: tape-core engaging shaft
23: ink-ribbon winding driving shaft
24: tape-width detection switch
25: control device
26: communication module
27: ROM
28: RAM
30: tape cartridge
31: cartridge case
32: tape core
34: ink-ribbon supply core
35: ink-ribbon winding core
36: thermal-head to-be-inserted portion
37: engaging portion
100: printing device
101, 102: information processing device

The invention claimed is:

1. A control device comprising:
a wireless communication unit configured to transmit and receive a signal with a communication terminal with which wireless connection has been established;
a control unit configured to perform predetermined control according to a request signal from the communication terminal; and
a printing unit configured to print on a to-be-printed medium,
wherein, when the wireless communication unit detects disconnection of the wireless connection with the communication terminal while the printing unit is printing on the to-be-printed medium, the control unit keeps the wireless communication unit in a state in which transmission of a beacon signal containing identification information of the wireless communication unit is stopped.

2. The control device according to claim 1, wherein the control unit is configured to control the printing unit to print on the to-be-printed medium according to the request signal from the communication terminal.

3. The control device according to claim 1, wherein, when a connection request is received from outside in a state in which the wireless communication unit detects disconnection of the wireless connection with the communication terminal, the control unit restricts the wireless communication unit from responding to the connection request from outside.

4. The control device according to claim 1, wherein, when a connection request is received from outside in a state in which the wireless communication unit detects disconnection of the wireless connection with the communication terminal, if the connection request is from a communication terminal with which the wireless connection has been established, the control unit causes the wireless communication unit to respond to the connection request.

5. The control device according to claim 1, wherein the control unit is configured:
   to perform the predetermined control according to the request signal received via the wireless communication unit,
   to notify the wireless communication unit of completion of the predetermined control after the predetermined control is completed, and
   to cause the wireless communication unit to start transmitting the beacon signal, in response to the notification from the control unit.

6. The control device according to claim 1, wherein the control unit is configured:
   to cause the printing unit to print according to the request signal received via the wireless communication unit,
   to notify the wireless communication unit of completion of printing after printing by the printing unit is completed, and
   to cause the wireless communication unit to start transmitting the beacon signal, in response to the notification from the control unit.

7. The control device according to claim 1, wherein the control unit is configured to cause the wireless communication unit to start transmitting the beacon signal after the predetermined control is completed.

8. The control device according to claim 1, wherein:
   the wireless communication unit is a Bluetooth Low Energy (BLE) module, and
   the beacon signal is an advertising packet according to the BLE standard.

9. A wireless connection control method comprising:
   receiving, by a control device, a request signal from a communication terminal with which wireless connection has been established;
   performing, by the control device, predetermined control according to the request signal;
   detecting, by the control device, disconnection of the wireless connection with the communication terminal during printing on a to-be-printed medium; and
   keeping, by the control device, a state in which transmission of a beacon signal containing identification information is stopped, in response to the detection of the disconnection.

10. A non-transitory computer-readable storage medium storing a program for causing a control device to execute processing comprising:
   causing a wireless communication unit to receive a request signal from a communication terminal with which wireless connection has been established;
   performing control for printing on a to-be-printed medium according to the request signal; and
   when the wireless communication unit detects disconnection of the wireless connection with the communication terminal during printing on the to-be-printed medium, keeping the wireless communication unit in a state in which transmission of a beacon signal containing identification information of the wireless communication unit is stopped.

* * * * *